(12) United States Patent
Lin (10) Patent No.: US 9,501,686 B2
(45) Date of Patent: Nov. 22, 2016

(54) MULTI-PURPOSE THIN FILM OPTOELECTRIC SENSOR

(71) Applicant: Shanghai Oxi Technology Co., Ltd, Shanghai (CN)

(72) Inventor: Weiping Lin, Shanghai (CN)

(73) Assignee: Shanghai Oxi Technology Co., Ltd. (CN)

( * ) Notice: Subject to any disclaimer, the term of this patent is extended or adjusted under 35 U.S.C. 154(b) by 150 days.

(21) Appl. No.: 14/493,907

(22) Filed: Sep. 23, 2014

(65) Prior Publication Data

US 2015/0369661 A1 Dec. 24, 2015

(30) Foreign Application Priority Data

Jun. 23, 2014 (CN) .......................... 2014 1 0283721

(51) Int. Cl.
*G06K 9/00* (2006.01)

(52) U.S. Cl.
CPC .................................... *G06K 9/0004* (2013.01)

(58) Field of Classification Search
CPC ........... G06K 9/0004; G06K 9/00013; G06K 9/00006
USPC ............ 250/227.11, 555, 556; 382/124–127; 356/71
See application file for complete search history.

(56) References Cited

U.S. PATENT DOCUMENTS

| 2003/0062490 A1* | 4/2003 | Fujieda ................. G06F 1/1626 250/556 |
| 2003/0189175 A1 | 10/2003 | Lee |
| 2004/0234107 A1* | 11/2004 | Machida ............. G06F 3/03547 382/107 |
| 2008/0237474 A1 | 10/2008 | Tonotani |
| 2009/0250630 A1* | 10/2009 | Van Der Zaag ... G01N 21/6428 250/459.1 |
| 2010/0321341 A1 | 12/2010 | Cho |
| 2013/0120760 A1 | 5/2013 | Raguin |

FOREIGN PATENT DOCUMENTS

TW I410703 6/2009

OTHER PUBLICATIONS

Taiwan Office Action dated Feb. 17, 2016 for TW Application No. 103133811.

* cited by examiner

*Primary Examiner* — Renee Chavez
(74) *Attorney, Agent, or Firm* — Swanson & Bratschun, L.L.C.

(57) ABSTRACT

An optoelectric sensor, comprising: a light-sensitive structure which comprises a substrate and an array of pixel cells located on the substrate, wherein each of the pixel cells comprises a thin film transistor and a photodiode; a fiber optical guide plate located above the light-sensitive structure, which comprises a group of optical fiber bundles configured to be perpendicular to the substrate, and each of the optical fiber bundles has an diameter smaller than or equal to a width of pixel cell; and a backlight source located below the light-sensitive structure. The fiber plate will enable each pixel cell detecting features of an object surface corresponding thereto more independently, so as to improve the resolution of the optoelectric sensor. The optical fiber bundles are configured to be perpendicular to the substrate, and the optoelectric sensor will have a thin structure.

16 Claims, 4 Drawing Sheets

MULTI-PURPOSE THIN FILM OPTOELECTRIC SENSOR

CROSS-REFERENCE TO RELATED APPLICATIONS

The present application claims priority to Chinese patent application No. 201410283721.8, filed on Jun. 23, 2014, and entitled "OPTOELECTRIC SENSOR", the entire disclosure of which is incorporated herein by reference.

TECHNICAL FIELD

The present disclosure generally relates to sensor, and more particularly, to an optoelectric sensor.

BACKGROUND

Optoelectric sensors, which can convert optical signals (e.g. infrared, visible and ultraviolet radiation) into electrical signals, are key elements to achieve photon to electricity conversion in various detecting systems, such as fingerprint sensor. Fingerprint identification, as one kind of biometric identification, has attracted widespread attention recently, especially in mobile payment applications.

In an existed optical fingerprint identification sensor, a CMOS (Complementary Metal Oxide Semiconductor) or CCD (Charge-Coupled Device) imaging sensor array is applied to collect optical signals for fingerprint detection.

Figure 1:
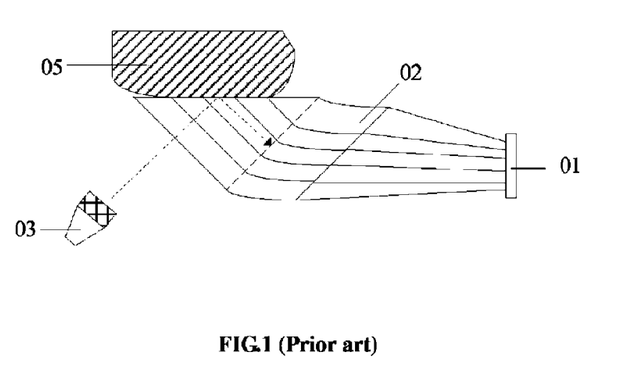
FIG. 1 is schematically illustrates a cross-sectional diagram of a optoelectric sensor according to prior art.

Referring to FIG. 1, one optical fingerprint identification sensor that applies CMOS imaging array is illustrated. The fingerprint sensor generally includes a CMOS imaging sensor array 01, an optical fiber array 02, and a light source 03. The optical fiber array 02 is an array that includes small-dimension optical fiber bundles, with the light source 03 located on one side. In a fingerprint identification process, a finger 05 contacted with the top end of the optical fiber array 02, lights of the light source 03 pass through the optical fiber array 02 and be reflected at the bottom part of the finger 05. The reflected lights then penetrate through the optical fiber array 02 to reach the CMOS imaging sensor array 01 in which pixel cells are disposed. Skin surface of finger 05 closely contacts to the top end of the optical fiber array 02, therefore the lights reflected by the ridge may have higher light intensity. Lights reflected by the valley may have lower light intensity. Therefore, light received by the pixel cells of the CMOS imaging sensor array 01 are different. The CMOS imaging sensor can convert optical signals of different light intensity into electrical signals, such that the information of the fingerprint surface can be obtained.

The optical fiber array 02 is used to partition the lights reflected by different parts of the bottom of the finger 05 and transmit them into different pixel cells in the CMOS imaging sensor array. However, since the pixel cells of the CMOS imaging sensor array have complicated structures and inadequate signal range to the reflected light, the contrast between the reflected lights of the ridge and valley is limited. Currently, an angle is defined between the light bundles of the optical fiber array 02 and one top end surface of the optical fiber array 02, so as to ensure that most of the reflected lights of the valley can not enter into the optical fiber array 02. Accordingly, the optical fiber array 02 is purposely configured to have a bended shape as shown in FIG. 1, while the CMOS imaging sensor array 01 is fixed on the other end of the optical fiber array 02, which top end surface is perpendicular to the optical fiber array 02. Although, it can be seen that the bended shape of the optical fiber array increases the size of the fingerprint identification area that can be detected by CMOS imaging sensor array, the whole fingerprint identification system will be difficult to be integrated into portable devices such as mobile phones. Furthermore, the light source 03 is located at one side of the optical fiber array 02, thus the light intensity received by different portions of the finger 05 are different from each other. Lights received by bottom portions with longer distance from the light source 03 may have lower light intensity, which makes the CMOS imaging sensor array 01 have poor uniformity.

Furthermore, the traditional optoelectric finger print sensors which require lenses may not be easily integrated into mobile devices, especially under the requirement of high resolution or the limitation of geometry.

Most of the currently existing finger print sensors such as capacitance type can only achieve single function. Products that can bring multifunction as well as being compact enough to fit into portable devices can bring benefit to the consumers and save cost for the manufactures.

SUMMARY

One embodiment of the present disclosure provides an optoelectric sensor, including:
- a light-sensitive structure, wherein the light-sensitive structure includes a substrate and an array of pixel cells located on the substrate, each of the pixel cell includes a thin film transistor and a photodiode;
- a fiber optic plate (FOP) located on top of the light-sensitive structure, wherein the FOP includes an array of optical fiber bundles which are configured to be perpendicular to the substrate, and each of the optical fiber bundles has a dimension smaller than or equal to a width of its corresponding pixel cell; and
- a backlight source located underneath the light-sensitive structure, wherein lights emitted by the backlight source pass through the light-sensitive structure and the optical fiber guide plate.

Optionally, the substrate has a first region and a second region, wherein the thin film transistor is located on the first region, and the photodiode is located on the second region.

Optionally, the thin film transistor includes:
- a gate located on the first region of the substrate;
- a first insulating layer which covers the gate;
- a channel layer located on the first insulating layer;
- a first electrode and a second electrode located on the channel layer, wherein a gap which exposes a part of the channel layer is defined between the first electrode and the second electrode; and
- a second insulating layer which covers the first electrode, the second electrode and the channel layer.

Optionally, the photodiode includes: a N doped semiconductor layer, an intrinsic semiconductor layer and a P doped semiconductor layer which are successively located on the second region of the substrate, wherein the N doped semiconductor layer is taken as a cathode of the photodiode, the intrinsic semiconductor layer is taken as a light-absorbing layer of the photodiode, and the P doped semiconductor layer is taken as an anode of the photodiode.

Optionally, the photodiode includes: an N doped semiconductor layer located on the second region of the substrate; and a P doped semiconductor layer located on the N doped semiconductor layer and in contact with the N doped semiconductor layer.

Optionally, the first insulating layer, the second electrode and the second insulating layer of the thin film transistor extend to the second region of the substrate, the second insulating layer located on the substrate has an opening which exposes the second electrode, and the N doped semiconductor layer of the photodiode covers the surface of the second electrode in the opening.

Optionally, a first barrier layer is disposed between the substrate and the first insulating layer which extends to the second region of the substrate, the first barrier layer is used to block lights emitted by the backlight source from entering into the photodiode from the bottom side; and the first barrier layer is located under the N doped semiconductor layer, and has a size lager than the size of the N doped semiconductor layer; an aperture is formed in the first barrier layer between the pixel cells, which is used to enable light emitted from the backlight source entering into the FOP.

Optionally, a contact electrode is disposed on the P doped semiconductor layer of the photodiode, and the contact electrode is made of a non-opaque conductive material such as ITO or ZnO.

Optionally, the first barrier layer includes metal, and the first barrier layer, along with the N doped semiconductor layer and the second electrode of the photodiode, constitute a storage capacitor.

Optionally, a third insulating layer is disposed on the second insulating layer of the thin film transistor for covering the photodiode and exposing a surface of the contact electrode.

Optionally, the substrate, the first insulating layer, the second insulating layer and the third insulating layer are all made of a non-opaque material.

Optionally, a second light-block barrier layer is disposed on the third insulating layer for covering the thin film transistor, wherein the second light-block barrier layer exposes the surface of the contact electrode of the photo-diode, and the second light-block barrier layer also exposes the aperture so as to make light emitted by the backlight source entering into the light-sensitive structure and passing through into the FOP.

Optionally, contact electrodes are disposed on top of the photodiode, which are used to electrically connect the anode of each pixel cell. The contact electrode is made of a non-opaque conductive material to allow incident lights from the FOP entering into the photodiode.

Optionally, the pixel cells are arranged in an array, and the optoelectric sensor further includes:
a driving chip, located on the light-sensitive structure and connected with an external power source or a TFT driving circuit;
a signal sensing chip, located on the light-sensitive structure and connected with the external power source;
gate lines, each of which has one end connected with the gates of the thin film transistors, and the other end connected with the driving chip to provide a scanning voltage to the gates of the thin film transistors, wherein the scanning voltage is used to open or close the thin film transistor;
data lines, each of which has one end connected with the first electrodes which are in a same row, and another end connected with the sensing chip to provide a base voltage to the first electrodes;
biasing voltage lines, each of which has one end connected with the contact electrodes, and the other end connected with the external power source to provide a biasing voltage to the contact electrodes, wherein the basing voltage and the base voltage are used to form a reverse bias voltage to the photodiode; and
an array of metal lines, each of which has one end connected with the first barrier layers which are in the same line, and the other end connected with an external voltage which is used to make the first barrier layer along with the N doped semiconductor layer and the second electrode of the photodiode to constitute a storage capacitor.

Optionally, the driving chip may be an amorphous silicon gate driver.

Optionally, the scanning voltage ranges from −10 volt to 15 volt, the base voltage ranges from 0 volt to 3 volt, the biasing voltage ranges from 0 volt to −10 volt, the external voltage ranges from 0 volt to −10 volt.

Optionally, the optical fiber guide plate has a thickness ranging from 0.2 mm to 10 mm.

Optionally, the backlight source has a planar structure, which has a thickness ranging from 0.2 mm to 10 mm.

Optionally, the backlight source includes a light-guide plate and a LED lamp which is located on one side of the light guide plate, the light-guide plate guides lights emitted along a lateral direction of the light guide plate to lights transmitting towards the light-sensitive structure.

Optionally, the backlight source includes at least one LED lamp selected from red light LED lamp, blue light LED lamp, green light LED lamp, white light LED lamp, infrared LED lamp and ultraviolet LED lamp, or only one LED lamp with a wavelength ranging from 300 nm to 1000 nm.

Optionally, the gate lines provide the scanning voltage to the gates; and the LED lamp emits light by way of impulses which has a frequency synchronized with a frame frequency of the scanning voltage.

Optionally, the LED lamp can emits light in a continuous way.

Optionally, the light-sensitive structure and the optical fiber plate are combined using glue or bound by mechanical lamination.

In comparison with prior art, technical solutions provided by the present disclosure have following advantages.

In the optoelectric sensor provided by the present disclosure, lights which pass through the optical fiber plate are reflected at an object surface (e.g. finger) which is in contact with the FOP, lights being reflected then enter into a photodiode, wherein the optical signals are converted into electrical signals through the photodiode, and the electrical signals are output through a thin film transistor, so as to represent the information of the object surface. The optical fiber guide plate includes optical fiber bundles which are perpendicular to the plane of the substrate, and each optical fiber bundle has a diameter smaller than the pixel cell. Therefore, lights reflected from the finger is constraint to the pixel cell located right under the spot that light is being reflected, and will not enter into the neighboring pixel cell. Interference between neighboring pixel cells can be minimized and resolution of the optoelectric sensor can be effectively improved.

Accordingly, the pixel cell which combines the photodiode and the thin film transistor has a simple structure and lower cost to manufacture.

The FOP in the present disclosure includes optical fiber bundles which are perpendicular to the substrate, and the FOP can be processed thinner and cheaper in production in comparison with bended optical fiber array in the prior art.

The backlight source under the substrate is used to emit incident lights to pass the light-sensitive structure and to be reflected at the object surface, thus allow each pixel cell in the light-sensitive structure receiving the reflected lights more uniformly, so as to further improve the resolution of the optoelectric sensor.

Furthermore, the photodiode includes: a N doped semiconductor layer, an intrinsic semiconductor layer, and a P doped semiconductor layer from bottom to top, wherein the N doped semiconductor layer is served as cathode of the photodiode, the intrinsic semiconductor layer is served as a light-absorb layer, and the P doped semiconductor layer is served as anode of the photodiode. A first barrier layer is disposed between the substrate and a first insulating layer which extends to the second region of the substrate, wherein the first barrier layer, along with the N doped semiconductor layer and the second electrode of the photodiode constitute a storage capacitor, which increase the signal storage capability of the photodiode. In another word, the pixel can store more electric charges to increase the signal range and therefore, improve the signal to noise ratio (SNR).

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Currently existing optical finger print sensors are generally bulky, have low resolution and are not easy to be integrated into portable devices. In order to solve problems as recited above, a new optoelectric sensor with lower cost, compact geometry and higher resolution is provided by the present disclosure, which is able to be preferably applied into potable devices.

Figure 2:
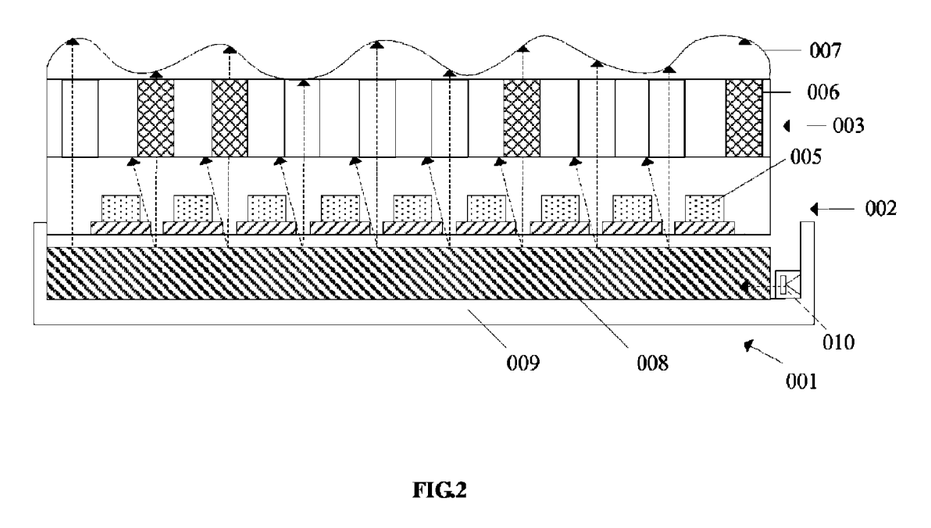
FIG. 2 is schematically illustrates a cross-sectional diagram of a optoelectric sensor according to one embodiment of the present disclosure.

Referring to FIG. 2, a cross-sectional diagram of an optoelectric sensor according to one embodiment of the present disclosure is illustrated. The optoelectric sensor of the present disclosure includes a light-sensitive structure 002, a fiber optic plate (FOP) 003, and a backlight source 001.

The light-sensitive structure 002 includes a substrate 100 and a plurality of pixel cells 005 located on the substrate 100, wherein each of the pixel cell 005 includes a thin film transistor and a photodiode. It should be noted that, specific structures of the pixel cells 005 are not illustrated in FIG. 2 for the purpose of providing a concise drawing.

The FOP 003 is located above the light-sensitive structure 002, the FOP 003 includes a group of optical fiber bundles 006 which are configured to be perpendicular to the substrate, each of the optical fiber bundles has a diameter smaller than or equal to the width of its corresponding pixel cell.

The backlight source 001 is located below the light-sensitive structure 002, wherein lights emitted by the backlight source can pass the light-sensitive structure and the FOP.

In the optoelectric sensor, lights penetrating through the FOP are reflected at an object surface (e.g. finger skin surface) which is in contact with the FOP, and reflected lights then enter into the photodiodes which can convert optical signals into electrical signals. Thereafter, the electrical signals converted by the photodiodes are in turn output by the thin film transistors when selected turn-on, thus information of the object surface can be obtained.

The FOP includes a group of optical fiber bundles which are configured to be perpendicular to the substrate, and each optical fiber bundle has a smaller diameter than the width of its corresponding pixel cell. Therefore, lights reflected from an upside of one specific pixel cell will be confined within this specific pixel cell and are not likely entering into a region of a neighboring pixel cell. In such way, each pixel cell mainly converts lights of the object surface which are reflected by an area of the object surface just above. Therefore, interference between neighboring pixel cells can be reduced and resolution of the optoelectric sensor can be effectively improved.

Each of the pixel cells which combines the photodiode and the thin film transistor has a simple structure, thus the bended optical fiber array may no longer be necessary. Accordingly, the optical fiber bundles included in the FOP are perpendicular to the substrate, thus the FOP may be lower in cost, simple in manufacture, thinner and smaller in volume in comparison with the bended optical fiber arrays in the prior art.

Furthermore, the backlight source located below the substrate is used to emit light. The incident light can penetrate through the substrate and be reflected at the object surface, thus each pixel cell in the light-sensitive structure can receive the reflected lights more uniformly. In such way, the resolution of the optoelectric sensor may be further improved.

More specifically, as shown in FIG. 2, in the embodiments, the backlight source 001 includes a light-guide plate 008 and a group of LED lamp 010 located on a side of the light-guide plate. The light-guide plate 008 guides lights emitted from the LED lamp 010 to be uniformly deflected up towards the light-sensitive plate (as shown in dotted arrows). Part of the light can penetrate through the FOP 003 and to be reflected at an object surface 007 above the optoelectric sensor, wherein intensity of the reflected lights are in correlation with profile of the object surface 007 (specifically, for example, lights reflected from valley parts of the object surface may have lower light intensities, while lights reflected from ridge parts of the object surface may have higher light intensities). Further, the reflected lights may again pass through the optical fiber guide plate 003 and enter into the light-sensitive structure 002. The reflected lights are optical signals containing information of the object surface 007, and the photodiodes of the pixel cells 005 are able to convert the optical signals into electrical signals which are able to be output by the thin film transistor.

In the embodiments, the LED lamp 010 may include a red light LED lamp, a blue light LED lamp, a green light LED lamp, a white light LED lamp, infrared LED lamp and an ultraviolet LED lamp. However, the present disclosure is not limited by the above given LED lamp types. Other types of LED lamp or only one or combination of those LED lamps may be used according to specific applications.

It should be noted that, the backlight source 001 may further include a backboard 009 which is used to fix the light-guide plate 008 and the LED lamp 010, in another word, the light-guide plate 008 and the LED lamp 010 are located on the backboard 009. However, the present disclosure is not limited by the above given backboard 009. In the embodiments, there may be no backboard 009, and the LED lamp 010 may be disposed on a side of the light-guide plate 008 instead.

Figure 3:
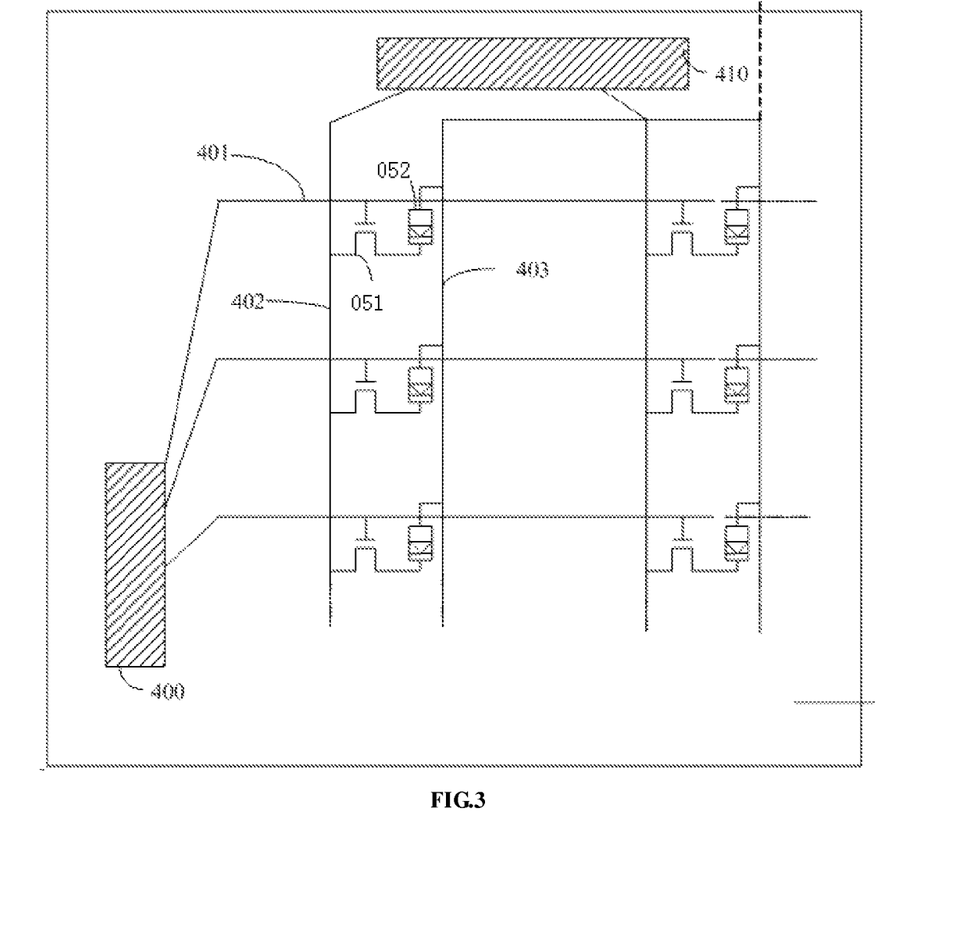
FIG. 3 schematically illustrates an operation principle of a optoelectric sensor according to one embodiment of the present disclosure.

Referring to FIG. 3, a cross-sectional diagram of the pixel cells in the optoelectric sensor according to one embodiment of the present disclosure is illustrated. The features and advantages of the optoelectric sensor according to the present disclosure will be given by an example of one pixel cell in the optoelectric sensor.

Figure 5:
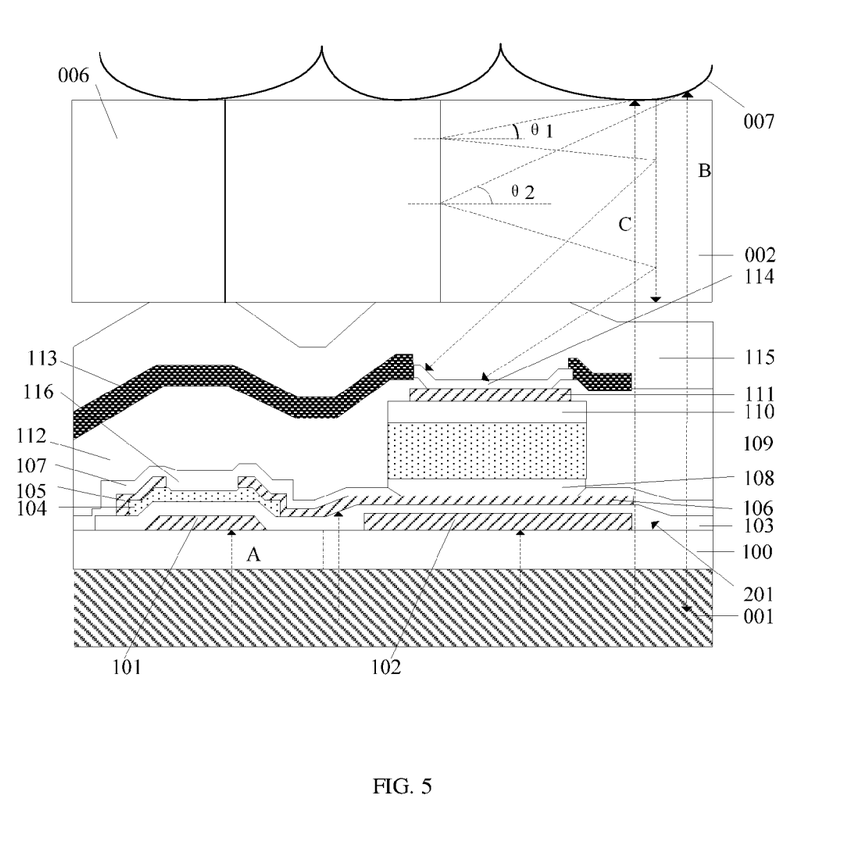
FIG. 5 schematically illustrates a cross-sectional diagram of a pixel cell in the optoelectric sensor illustrated in FIG. 2.

Referring to FIG. 5, one of the pixel cells in the optoelectric sensor as shown in FIG. 3 is illustrated. It should be noted that, a portion of the backlight source 001 and a portion of the FOP 003 which are corresponded to one single pixel cell are also illustrated, so as to give a clear illustration to features of the optoelectric sensor. The pixel cell includes a thin film transistor 051 and a photodiode 052.

Incident lights of the optoelectric sensor are emitted from the backlight source located below the substrate and exit from the upper side of the optoelectric sensor, then reflect at the object surface 007 on the optoelectric sensor and be reflected back to the optoelectric sensor, wherein the substrate is required to be made of non-opaque material for allowing lights to penetrate through. In the embodiments, the substrate may be made of glass. However, in some other embodiments, the substrate may be made of non-opaque plastic and the like, so the present disclosure is not limited by the above given materials of the substrate.

The substrate 100 has a first region and a second region, the thin film transistor 051 located on the first region, and the photodiode 052 located on the second region.

The thin film transistor 051 includes the follows.

A gate 101 which is located on the first region of the substrate 100.

A first insulating layer 103 which covers the gate 101.

A channel layer 104 which is located on the first insulating layer 103.

A first electrode 105 and a second electrode 106 which are located on the channel layer 104, wherein a gap 116 which exposes the channel layer 104 is formed between the first electrode 105 and the second electrode 106.

And a second insulating layer 107 which covers the first electrode 105, the second electrode 106 and the channel layer 104.

The thin film transistor has a structure and an operation principal similar to conventional bottom gate thin film transistors in the prior art, so the operation principal of the thin film transistor will not be described herein. It should be noted that, in the embodiments, the first insulating layer 103 and the second insulating layer 107 are made of silicon nitride, therefore lights are able to pass through the first insulating layer 103. However, the present disclosure is not limited by the above given materials of the first insulating layer 103 and the second insulating layer 107. In the embodiments, the first insulating layer 103 and second insulating layer 107 may be made of silicon oxide or spin coating material.

Differences between the structure of the thin film transistor in the pixel cell of the optoelectric sensor according to embodiments of the present disclosure and structure of the bottom gate thin film transistor in the prior art are described as followed. The first insulating layer 103, the second electrode 106 and the second insulating layer 106 also extent to the second region of the substrate 100, and the second insulating layer 107 located on the second region exposes an opening of the second electrode 106.

The photodiode includes: a N doped conductor layer 108, an intrinsic semiconductor layer 109, and a P doped conductor layer 110 successively located on the second electrode 106 being exposed by the opening, wherein the N doped conductor layer 108 covers a surface of the second electrode 106. The N doped conductor layer 108 servers as a cathode of the photodiode, the intrinsic semiconductor layer 109 servers as a light-absorb layer of the photodiode, and the P doped conductor layer 110 servers as a anode of the photodiode.

It should be noted that, the present disclosure is not limited by the above given specific structure of the photodiode. In the embodiments, the photodiode may not include the intrinsic semiconductor layer 109. In another word, the main structure of the photodiode only includes: the N doped conductor layer located on the second region of the substrate; and the P doped conductor layer which is located on and contacted with the N doped conductor layer.

It also should be noted that, a first barrier layer 102 is disposed between the substrate 100 and the first insulating layer 103 which extends to the second region of the substrate 100, wherein the first barrier 102 is located below the N doped conductor layer 108 and has a size larger than the size of the N doped conductor layer 108, the first barrier 102 is used to prevent lights emitted from the backlight source 001 disposed below the substrate 100 from entering into the photodiode, so as to reduce interference to the photodiode caused by the lights emitted from the backlight source 001.

In the embodiments, the first barrier layer 102 and the gate 101 are formed in the same process and are made of the same material. More specifically, the first barrier 102 and the gate may be both made of metal such as molybdenum, aluminum or aluminum alloy, etc. However, the present disclosure is not limited by the above given material of the first barrier 102 and simultaneously forming mode of the first barrier layer 102 and the gate 101.

It should be noted that, gaps 201 are formed between the first barrier layers 102 of two neighboring pixel cells, or in another word, the first barrier layers 102 of the pixel cells in the light-sensitive structure form an array of light transmitting gaps 201, thus lights emitted from the backlight source 001 are able to enter into the light-sensitive structure 002 through the gaps 201 and reach the FOP 003. In the embodiments, the pixel cells are arranged in an array, thus the gaps between the first barrier layers 102 of the pixel cell array are evenly distributed, and lights emitted from the backlight source 001 will be confined into a dot matrix mode, therefore incident lights emitted from downside of each pixel cell have a photon flux identical to each other, and the incident lights emitted from one specific pixel are confined to a place just close to this specific pixel cell for reducing interference to other pixel cells.

A contact electrode 111 is disposed on an upper side of the P doped semiconductor layer 110 of the optoelectric transistor, so that the P doped semiconductor layer 110 is adapted to being electrically connected with an external power source. The contact electrode 111 may be made of indium tin oxide or zinc oxide, wherein the indium tin oxide and the zinc oxide are both transparent conductive material, so that lights emitted from the optical fiber guide plate 003 are able to enter into the photodiode.

As shown in FIG. 5, a third insulating layer 112 is disposed on an upper side of the second insulating layer 107 of the thin film transistor, the third insulating layer 112 is used for overlaying the photodiode and exposing a surface of the contact electrode 111. In the embodiments, the third insulating layer 112 may be made of silicon nitride. However, the present disclosure is not limited by the above given material of the third insulating layer 112. Furthermore, the third insulating layer 112 may also be made of other transparent insulating materials, such as silicon oxide or spin coating material.

The third insulating layer 112 is covered by a second light-block barrier layer 113, wherein the second light-block barrier layer 113 is used to prevent lights with larger incident angle emitting back from the FOP 003 from entering into the photodiode and entering into the thin film transistor. Light absorbed by the thin film transistor may cause leakage current between source and drain region. As a result of that, signal charge will be lost. The second light-block barrier layer 113 exposes the surface of the contact electrode 111. The second light-block barrier layer 113 also exposes the light holes 201, so that lights emitted from the backlight source 001 is adapted to entering into the light-sensitive structure 002 through the gaps 201 and being irradiated on the FOP 003.

In some other embodiments, connect electrodes 114 are further disposed on a surface of each contact electrode 111, which are used to electrically connect each of the pixel cells, wherein the connect electrodes 114 maybe made of non-opaque material such as indium tin oxide or zinc oxide and the like, so that the lights which are reflected at the object surface 007 and enter into the FOP 003 are able to enter into the photodiode.

An operation principal of the optoelectric sensor according to the present disclosure is as follows: lights emitted from the backlight source 001 penetrate through the pixel cells through the aperture and enter into the FOP 003, and then reach the object surface 007 and be reflected back to the FOP 003, some of the reflected lights are able to penetrate through the FOP and enter into the contact electrode 111 of the pixel cell corresponding thereto, and thus enter into the photodiode.

The P doped semiconductor layer 110 of the photodiode connects to a fixed negative voltage through the contact electrode 111, and the first electrode 105 (the source of the thin film transistor) connects to a positive voltage or a zero voltage. When the gate 101 connects with a scanning voltage larger than a threshold voltage, the thin film transistor will be turned on, and the second electrode 106 (drain of the thin film transistor) and the first electrode 105 of the thin film transistor will have the same potential. Given that the N doped semiconductor layer 108 of the photodiode (the cathode of the photodiode) is connected with the second electrode, or in another word, the N doped semiconductor layer 108 of the photodiode is connected to the positive voltage or the zero voltage, a reverse bias voltage will be applied to the photodiode. After absorbing light, negatively charged electrons will accumulate in the N doped semiconductor layer 108. Positively charged holes will accumulate in the P doped semiconductor layer 110, wherein the number of the negatively charged electrons accumulated in the N doped semiconductor layer 108 or holes in the 110 is correlated to the light intensity received by the intrinsic semiconductor layer 109 of the photodiode. Due to the difference of reflectivity of each surface, the numbers of charges accumulated in the each pixel cell are different from each other. When the gate 101 opens, the negative charges stored in the N doped semiconductor layers 108 of each pixel cell will be transferred to electrode 105 through the second electrode 106 and the channel layer 104 and will be sensed and amplified by the processing chip 410. In such manner, the optical signals are converted into electrical signals.

In the embodiments, a non-opaque passivating layer 115 which covers an upper side of the second light-block barrier layer 113 is disposed, so as to protect the second light-block barrier layer 113 from damages such as erosion and the like. However, the present disclosure is not limited by the above given passivating layer 115 which covers the upper side of the second light-block barrier layer 113, and In the embodiments, the passivating layer 115 may not be disposed.

Referring to FIG. 3, in the embodiments, the pixel cells are configured into an array pattern, and the optoelectric sensor further includes a driving chip 400, a sensing chip 410, gate lines 401, data lines 402, and biasing voltage connection lines 403.

The driving chip 400 serves as an output terminal. In the embodiments, the driving chip 400 is pressed and bonded to the substrate of the light-sensitive structure 002, wherein the driving chip 400 is located at the periphery part of the substrate and extends along a lateral direction of the pixel cell array. However, the present disclosure is not limited by the above given position of the driving chip and ways of connection between the driving chip and light-sensitive structure 002. Furthermore, the driving chip 400 is connected with the external power source so as to provide a scanning voltage to the optoelectric sensor.

The sensing chip 410 serves as an output terminal and a receiving terminal In the embodiments, the sensing chip 410 is pressed and bonded to the substrate of the light-sensitive structure 002, wherein the sensing chip 410 is located at the periphery part of the substrate and extends along a line of the pixel cell array. However, the present disclosure is not limited by the above given position of the sensing chip and ways of connecting between the driving chip and light-sensitive structure 002. Furthermore, the signal sensing chip 410 is connected with the external power source so as to provide a fixed voltage to the optoelectric sensor.

Each of the gate lines 401 has one end connected with gates 101 of the film transistors which are in a same line, and another end connected with the driving chip, so as to provide a scanning voltage to the gates of the thin film transistors. The scanning voltage is used to open or close the thin film transistor. Optionally, the scanning voltage ranges from −10 volt to 15 volt, which is an impulse having a scanning time and a closed time. It should be noted that, the scanning voltage provided by the gate lines is in a rolling mode, in another word, gates of each line of the pixel cells successively turn on, which starts from the first line. The scanning frequency of each line is set to be equal so that each pixel will have same period of accumulation time.

Each of the first lines 402 has one end connected with the first electrodes 105 of the pixel cell which are in the same row, and another end connected with the sensing chip 410 to provide a base voltage to the first electrode. The base voltage is fixed in the range from 0 volt to 3 volt. It should be noted that, the base voltage is in a fixed value, and the first electrode 105 is connected with the sensing chip 410. When the thin film transistor opens, the charge stored in the N doped semiconductor layer 108 will be transferred to the data line and sensed by the chip 410. Then the base voltage will be loaded on the second electrode 106, thus a reverse bias voltage will be applied between the anode and the cathode of the photodiode. Therefore, photodiode and storage capacitor was reset once again for next cycle. It should be noted that, the base voltage provided to the first electrode 105 by the driving chip 400 is a fixed value which will not change due to the accumulating of negative charge in the N doped semiconductor layer 108.

It also should be noted that, as the base voltages of all pixel cells range from 0 volt to 3 volt and the biasing voltage coming from 403 is a fixed value, and all the P layer and electrode 114 of each pixel are connected together to the external negative bias power source. At least one line by not limited to one line is required to connect to the external power source.

In the embodiments, functions of providing electrical signals to the optoelectric sensor and converting optical signals into electrical signals are achieved through combing the driving chip 400, the first leads 402, the second leads 403 and the gate leads 401 with the pixel cells of the present disclosure. However, ways of inputting and outputting optical signals by the pixel cells of the optoelectric sensor of the present disclosure are not limited to the ways recited above. In some other embodiments, the pixel cells of the optoelectric sensor of the present disclosure may input and output optical signals through other ways such as changing between the scanning time of the gate 101 and resetting time of the first electrode 105, changing the way of scanning of the gate 101 into interlaced scanning, etc. All these changes of the ways of inputting and outputting of the optical signals of the pixel cells should not be taken as limitations to the present disclosure.

Figure 4:
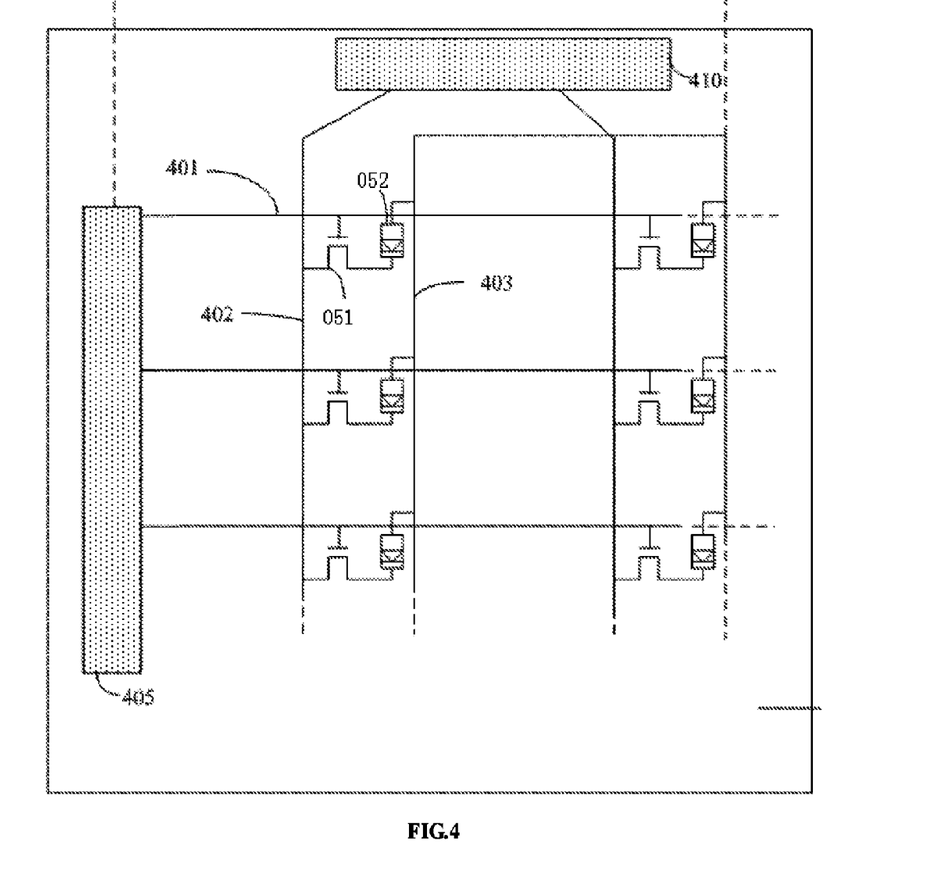
FIG. 4 schematically illustrates an operation principle of a optoelectric sensor according to one embodiment of the present disclosure.

Referring to FIG. 4, an operation principal of an optoelectric sensor according to another embodiment of the present disclosure is illustrated. The optoelectric sensor further includes an amorphous silicon gate (ASG) driver 405, a reading chip 410, an array of gate lines 401, an array of first lines 402 and a group of lines 403.

The ASG driver 405 is located on a substrate 100 and connected with an external power source to provide a scanning voltage for gates 101. A difference between the ASG driver 405 and the driving chip 400 is that the ASG driver 405 is formed on the substrate simultaneously with a thin film transistor and a photodiode, in another word, the ASG driver 405 is an integrated circuit directly formed on the substrate 100. The ASG driver is located at the periphery of the substrate and extends along the row direction of the pixel cell array, which has a length along the row direction almost the same with a length of the pixel cell array along the row direction. Comparing FIG. 4 to FIG. 3, it can be seen that the gate lines 401 is able to directly connect with the ASG driver 405, and therefore reducing the size of the sensor and manufacturing cost.

The FOP 003 is used to improve the resolution of the optoelectric sensor of the present disclosure as well as serving as surface protection material. As shown in FIG. 5, an example of one pixel cell along with portion of the FOP 003 and portion of the backlight source 001 corresponding thereto is illustrated for introducing an operation principal of an optoelectric sensor which applies the FOP 003 to improve its resolution.

The FOP 003 includes a group of optical fiber bundles 006 which are configured to be perpendicular to the substrate, wherein each optical fiber bundle 006 has a diameter smaller or equal to a width of its corresponding pixel cell. The principle of total internal reflection of light is applied in the transmission of the lights in the optical fiber bundle 006, wherein the optical fiber bundle 006 has an inner core and a cladding, and the inner core has a larger refractive index than the cladding. After lights enter into one end of the optical fiber bundle 006 from air or a object surface, and the incident angle of the lights is larger than a critical angle of the optical fiber bundle 006, a total reflection of the lights will occur in the optical fiber bundle 006, or in another word, multiple reflections of the lights will occur at interface of the inner core and the cladding until the lights emits out from the other end of the optical fiber bundle 006.

FIG. 5 illustrates three types of lights emitted by the backlight source: lights A, lights B and lights C, wherein directions of propagation of lights A and lights B both come from backlight source. Lights A are emitted by a part of the backlight source 001 below the thin film transistor and the photodiode, which is blocked by the gate 101, the first barrier layer 102 or the second electrode 106 and can not penetrate through the thin film transistor or the photodiode into the optical fiber guide plate 003.

Lights B are emitted from the backlight source 001 below the gaps 201 between the first barrier layers 102 of neighboring pixel cells, which penetrate through the first insulating layer 103, the second insulating layer 107, the third insulating layer 112 and the passivating layer 115 into the FOP 003. The direction of lights B is the same with a direction of the axis of the optical fiber bundle 006, thus lights B is able to directly emit from a upper end of the optical fiber bundle 006 and reflect at point A of the object surface 007, lights B being reflected enter into another optical fiber bundle 006 above the specific pixel cell and have a angle 02 with respect to the normal of the optical fiber bundle 006, wherein 02 is larger than the critical angle of the optical fiber bundle 006, thus multiple reflections of the lights B will occur at the interface of the inner core and the cladding of the optical fiber bundle 006 until the lights B emit from the other end of the optical fiber bundle 006 and enter into the photodiode through the non-opaque passivating layer 115, the connect electrode 114 and the contact electrode 111.

Lights C are emitted from the backlight source 001 below the gaps 201 between the first barrier layers 102 of neighboring pixel cells, which penetrate through the first insulating layer 103, the second insulating layer 107, the third insulating layer 112 and the passivating layer 115 into the FOP 003. The incident direction of lights C is the same with a direction of the axis of the optical fiber bundle 006, thus lights C are able to directly emit from a upper end of the optical fiber bundle 006 and reflect at the object surface 007, lights C being reflected have a larger angle with the FOP 003 and have a angle 01 with respect to the normal of the optical fiber bundle 006, wherein 01 is larger than the critical angle of the optical fiber bundle 006, thus multiple reflections of the lights C will occur on the interface of the inner core and the cladding of the optical fiber bundle 006 until the lights C emit from the other end of the optical fiber bundle 006 and enter into the photodiode through the non-opaque passivating layer 115, the connect electrode 114 and the contact electrode 111.

From lights B and lights C, it can be seen that: a reflection point of the lights reflected by the object surface 007 above a specific pixel cell has a close horizontal distance with the optical fiber bundle 006 above this specific pixel cell, thus the angle between the reflected lights and the normal direction of the sidewall of the optical fiber bundle 006 above this specific pixel cell is larger, when the angle is larger than the critical angle, the lights are able to emit from the other end of the bundle 006; if the FOP 003 is not disposed, a transparent cover material such as glass need to be disposed on the light-sensitive structure 002 for protecting the light-sensitive structure 002, wherein the transparent cover has certain thickness and the reflected lights C have a larger incident angle with respect to the surface of the substrate 100, thus the reflected lights C have a longer optical path in the transparent cover board and are able to emit into a neighboring pixel cell of the specific pixel cell easily after penetrating through the transparent cover, which will cause decline of the contrast ratio. In the optoelectric sensor of the present disclosure, the FOP 003 is disposed for making the total internal reflections of the lights C occur at sidewall of the optical fiber bundle 006, so as to confine reflected lights, like the reflected lights C, which have larger angles with respect to the substrate 100 within the specific pixel cell, therefore the reflected lights C are not tend to interfere with the neighboring pixel cell. Similarly, lights emitted from the backlight source 001 under the specific pixel are also not tend to enter into the object surface 007 above other pixel cells through the FOP 003, thus each pixel cell is able to independently detect features of the corresponding object surface 007 there above, and has less interferences from lights reflected from the object surface 007 above other pixel cells, therefore constraints to the reflected lights and resolution of the optoelectric sensor are both effectively improved.

It should be noted that, the aperture of each optical fiber bundle 006 should be smaller than the size of its corresponding pixel cell.

In the embodiments, there is no lens disposed between the pixel cells and the optical fiber guide plate 003, so that one pixel cell mainly converts optical signals of the object surface 007 with same area above this specific pixel cell into electric signals only. In another word, a proportion between a area of one pixel cell and a area of the object surface 007 being detected by this specific pixel cell is about 1:1, so that the reflected lights do not change the direction by and large after being emitted from a lower end of the optical fiber bundle 006, which are not tend to cause interference to other pixel cells.

It also should be noted that, in the embodiments, in order to prevent reflected lights which do not meet the requirement of the total reflection from penetrating through the sidewalls of the optical fiber bundles 006 and entering into the photodiode, the claddings of the optical fiber bundles 006 can be made of light-absorb materials, so that the reflected lights which are not meet with requirements of the total reflection will be absorbed by sidewalls of the optical fiber bundles 006. Therefore, interference to the pixel cells caused by the reflected lights which do not meet with requirements of the total reflection will be reduced.

Furthermore, some embodiments of the present disclosure combine the photodiode and the thin film transistor, so that the pixel cells will have simple structures, and the bended optical fiber array will not be necessary. The FOP of the present disclosure includes optical fiber bundles 006 which are configured to be perpendicular to the substrate 100, which is lower in cost, more simple in manufacturing, thinner and smaller in volume in comparison with the bended optical fiber array in the prior art.

In the embodiments, the photodiode may further include a plurality of third leads each of which has one end connected with the first barrier layers 102 of the pixel cells which are in a same line, and another end connected with the second leads, so as to provide an external voltage to the first barrier layers 102, wherein the external voltage is used to constitute a storage capacitor by the first barrier layer and the N doped semiconductor layer of the photodiode along with the second electrode. Optionally, the external voltage ranges from 0 volt to −10 volt.

As the N doped semiconductor layer 108 of the pixel cell stores negative charge, the second electrode 106 contacts with the N doped semiconductor layer 108, so the storage capacitors is constituted by the N doped semiconductor layer 108 along with the second electrode 106 and the first barrier layer 102, wherein the N doped semiconductor layer 108 and the second electrode 106 constitute the first electrode of the storage capacitor, the first barrier layer 102 constitutes the second electrode of the storage capacitor. As the size of the first barrier layer 102 is larger than the size of the N doped semiconductor layer 108, an area of the storage capacitor is about equal to an area of the N doped semiconductor layer 108.

The quantity of the charge stored in the N doped semiconductor layer 108, or in another word, amount of the electrical signals converted from the optical signals will be effectively enlarged by the storage capacitor. As the signal to noise ratio (SNR) is in direct proportion with a square root of the signal, the SNR governed by quantum noise is increased by increasing the amount of signal charge.

In the embodiments, as the external voltage is in a fixed value, the third lead may also directly connect to the external voltage through via holes which are disposed at the periphery of the pixel cell array.

Back to FIG. 2, in the optoelectric sensor of the present disclosure, the light-sensitive structure 002 and the FOP 003 are bound together through simple ways. Optionally, gluing or mechanical lamination may be applied to bond the light-sensitive structure 002 and the FOP 003.

The FOP 003 is bond on top of the light-sensitive structure 002 to prevent the surface of the light-sensitive structure 002 from being scratched, from water or stain, or from the pixel cells in the light-sensitive structure 002 being damaged by static charge, etc.

In the embodiments, the FOP 003 has a thickness ranging from 0.2 mm to 10 mm, the backlight source 001 has a thickness ranging from 0.2 mm to 10 mm, and a thickness of the light-sensitive structure is mainly equal to the thickness of the glass substrate applied, which ranges from 0.2 mm to 10 mm.

The optoelectric sensor of the present disclosure is able to be applied into many fields such as counterfeit currency recognition, fingerprint identification, venography, file scan, etc.

In the embodiments, the LED lam 010 of the backlight source 001 includes red light LED lamp, blue light LED lamp, green LED lamp, infrared LED lamp, ultraviolet LED lamp and white light LED lamp.

Continue with FIG. 2, when the optoelectric sensor of the present disclosure is applied to color file scan, the red light LED lamp, the blue light LED lamp and the green light LED lamp of the backlight source 001 will be turned on sequentially. Specifically, obtaining a color file image need to scan the image three times, wherein turning on the red LED lamp only during a first frame, turning on the blue light LED lamp only during a second frame, and turning on the green light LED lamp only during the third frame, repeating the above recited steps by taking three frames as one cycle but necessarily in that sequence. During the first frame, only the red light LED lamp is turned on, thus optical signals received by the photodiode is red light signal only, during the second frame, only the blue light LED lamp is turned on, thus optical signals received by the photodiode is blue lights signal only, and during the third frame, only the green light LED lamp is turned on, thus optical signals received by the photodiode is green lights signal only. Red light, blue light and green light signals respectively received by the photodiodes of the pixel cell array are converted into electrical signals and processed into one color image. In that case the traditional color filter is saved.

When the optoelectric sensor of the present disclosure is applied to fingerprint identification, only one LED lamp need to be turned on as information carried by the fingerprint can be obtained by the reflected lights thereof When the optoelectric sensor is applied to venography, infrared (having a wavelength ranges from 700 nanometer to 1000 nanometer) LED lamp in the backlight source 001 will be used. Infrared lights emitted by the infrared LED lamp are able to penetrate through skin and absorbed by blood in the vessels.

It should be noted that the pulse rate of the human body synchronize along with the blood flowing in and out the vessel. The sensor detects the pulse through detecting changes of the blood concentration under the skin. It should be noted that, the operating frequency of the optoelectric sensor should be faster than the human pulse. Generally, the operating frequency of the optoelectric sensor is above 7 hertz.

When the optoelectric sensor of the present disclosure is applied to counterfeit currency recognition, only the ultraviolet (having a wavelength ranges from 250 nanometer to 380 nanometer) LED lamp turns on. Modern money printing applies special ink which will glow at other wavelengths under radiation of ultraviolet. For example, if put a paper money which emits red lights on the FOP 003 of the optoelectric sensor of the present disclosure, ultraviolet lights emitted from the backlight source of the optoelectric sensor of the present disclosure will reflect at a pattern printed by the special printing ink, and red lights being reflected carry with information of the pattern printed by the special printing ink, so that the optoelectric sensor of the present disclosure is able to distinguish real money from counterfeit through an identification of the reflected red lights.

In the embodiments, each LED lamp 010 in the backlight source 001 is controlled by different switches respectively, and light intensities emitted from each LED lamp 010 are able to be controlled by an electric current loaded on the LED lamp 010 so as to adapt for different circumstances.

Through turning on different LED lamp 010 in the backlight source 001 and matching with different control programs, the optoelectric sensor provided by the present disclosure is able to be applied to many fields such as counterfeit currency recognition, fingerprint identification, venography, file scan, etc., thus the optoelectric sensor of the present disclosure does not need to be redesigned for different applications. It should be noted that, the LED lamp of the optoelectric sensor are not limited to the red light LED lamp, the blue light LED lamp, the green light LED lamp, the infrared LED lamp, the ultraviolet light LED lamp and the white light LED lamp. In some other embodiments, the LED lamp 010 may only include one or some of the above recited LED lamp, thus optoelectric sensors with different LED lamp may be used according to different applications.

It should be noted that, the LED lamp may be emitted by ways of impulse which has a synchronous frequency with frame frequencies of the scanning voltages of gates in the pixel cells. It is defined as on frame that when gates in each line of the pixel cell array successively complete resetting processes of the scanning voltages, and there is a delay time between two frames. During the delay time, no scanning voltage is applied. The impulse has a synchronous frequency with frame frequencies of the scanning voltages of gates in the pixel cells means that the LED lamp 010 are turned on during the delay time to charge up the diodes. Advantages of such pulse mode are as followed: in the lights emitted by the LED lamp 010, there is a small amount of ambient lights entered into the light-sensitive structure 002 through ways such as from a gap between the light-sensitive structure 002 and the backlight source 001, which will cause interference to the optoelectric sensor and be referred to as background lights. However, in the embodiments of the present disclosure, the LED lamp emit lights by ways of impulse will eliminate above recited interference caused by the background lights, so as to increase the SNR of the optoelectric sensor and save energies.

However, the present disclosure is not limited by the above given pulse mode, and in the embodiments, the LED lamp 010 may emit lights by a continuously way.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. An optoelectric sensor, comprising:
a light-sensitive structure which comprises a substrate and an array of pixel cells located on the substrate, wherein each of the pixel cells comprises a thin film transistor and a photodiode;
a fiber optic guide plate located on top of the light-sensitive structure, wherein the fiber optical guide plate comprises an array of optical fiber bundles which are configured to be perpendicular to the substrate, and each of the optical fiber bundles has a diameter smaller than or equal to a width of its corresponding pixel cell;
a backlight source located underneath the light-sensitive structure, which is adapted to emitting lights to penetrate through the light-sensitive structure and the fiber optical guide plate;
wherein the substrate has a first region and a second region, the thin film transistor is located on the first region, and the photodiode is located on the second region;
and wherein the thin film transistor comprises;
a gate located on the first region of the substrate;
a first insulating layer covering the gate;
a channel layer located on the first insulating layer;
a first electrode and a second electrode which are both located on the channel layer, wherein a gap which partially exposes the channel layer is formed between the first electrode and the second electrode; and
a second insulating layer covering the first electrode, the second electrode and the channel layer;
and wherein the photodiode comprises;
a N doped semiconductor layer located on the second region of the substrate; and
a P doped semiconductor layer located on the N doped semiconductor layer;
and wherein the first insulating layer, the second electrode and the second insulating layer of the thin film transistor extend to the second region of the substrate, the second insulating layer located on the second region of the substrate has an opening which exposes the second electrode, and the N doped semiconductor layer of the photodiode covers a surface of the second electrode in the opening.

2. The optoelectric sensor according to claim 1, wherein the photodiode further comprises an intrinsic semiconductor layer located on the second region of the substrate, wherein the N doped semiconductor layer serves as a cathode of the photodiode, the intrinsic semiconductor layer serves as a light-absorb layer of the photodiode, and the P doped semiconductor layer serves as a anode of the photodiode.

3. The optoelectric sensor according to claim 1, further comprising:
a first barrier layer disposed between the substrate and the first insulating layer which extends to the second region of the substrate for blocking the lights emitted by the backlight source from entering into the photodiode;
wherein the first barrier layer is located below the N doped semiconductor layer, and has a size lager than that of the N doped semiconductor layer; and
wherein an aperture is formed in the first barrier layer between two of the pixel cells, the aperture is used to allow the lights emitted from the backlight source entering into the light-sensitive structure and irradiating to the optical fiber plate there through.

4. The optoelectric sensor according to claim 1, further comprising a contact electrode disposed on the P doped semiconductor layer of the photodiode, wherein the contact electrode comprises a non-opaque conductive material.

5. The optoelectric sensor according to claim 4, further comprising a third insulating layer disposed on the second insulating layer of the thin film transistor for overlaying the photodiode and exposing a surface of the contact electrode.

6. The optoelectric sensor according to claim 5, wherein the substrate, the first insulating layer, the second insulating layer and the third insulating layer all comprise a non-opaque material.

7. The optoelectric sensor according to claim 5, further comprising: a second light-block barrier layer disposed on the third insulating layer for covering the thin film transistor, wherein the second light-block barrier layer exposes the surface of the contact electrode of photodiode, and the second light-block barrier layer also exposes the aperture so as to allow the lights emitted from the backlight source entering into the light-sensitive structure and irradiating to the fiber optic plate.

8. The optoelectric sensor according to claim 4, further comprising a connect electrode disposed on each contact electrode for electrically connecting the contact electrode of each pixel cell, wherein the connect electrode comprises non-opaque conductive material for allowing incident lights from the fiber optic guide plate entering into the photodiode.

9. The optoelectric sensor according to claim 4, wherein the pixel cells are arranged in an array, and the optoelectric sensor further comprises:
a driving chip, located on the light-sensitive structure and connected with an external power source;
a signal sensing chip, located on the light-sensitive structure and connected with the external power source;
a number of gate lines, each of which has one end connected with the gates of the thin film transistors which are in a same line, and another end connected with the driving chip, so as to provide a scanning voltage to the gates of the thin film transistors, wherein the scanning voltage is used to open or close the thin film transistor;
a number of data lines, each of which has one end connected with the first electrodes which are in a same row, and another end connected with the reading chip, so as to provide a base voltage to the first electrodes;
a group of biasing voltage lines , each of which has one end connected with the connect electrodes which are in the same row, and another end connected with the external power source, so as to provide a biasing voltage to the contact electrodes, wherein the biasing voltage and the base voltage are used to form a reverse bias voltage in the photodiode; and
an array of metal lines, each of which has one end connected with the first barrier layers which are in the same line, and another end connected with the voltage biasing lines, so as to provide an external voltage which is used to make the first barrier layer along with the N doped semiconductor layer and the second electrode extending to the second region of the substrate to constitute a storage capacitor.

10. The optoelectric sensor according to claim 9, wherein the scanning voltage ranges from −10 volt to 15 volt, the base voltage ranges from 0 volt to 3volt, the biasing voltage ranges from 0 volt to −10 volt, and the external voltage ranges from 0 volt to −10 volt.

11. The optoelectric sensor according to claim 1, further comprising:
a first barrier layer disposed between the substrate and the first insulating layer which extends to the second region of the substrate for blocking the lights emitted by the backlight source from entering into the photodiode;
wherein the first barrier layer comprises metal, and the first barrier layer, along with the N doped semiconductor layer and the second electrode extending to the second region of the substrate, constitute a storage capacitor.

12. The optoelectric sensor according to claim 1, wherein the fiber optic guide plate has a thickness ranging from 0.2 mm to 10 mm.

13. The optoelectric sensor according to claim 1, wherein the backlight source comprises at least one LED lamp selected from red light LED lamp, blue light LED lamp, green light LED lamp, white light LED lamp, infrared LED lamp and ultraviolet LED lamp, or only one LED lamp with a wavelength ranging from 300 nm to 1000 nm.

14. The optoelectric sensor according to claim 13, wherein the LED lamp emits lights by way of impulse.

15. The optoelectric sensor according to claim 13, wherein the LED lamp emits lights in a continuous way.

16. The optoelectric sensor according to claim 1, wherein the light-sensitive structure and the optical fiber plate are combined using glue or bond by mechanical bonding.

* * * * *